US006834042B1

(12) United States Patent
Sugiyama (10) Patent No.: US 6,834,042 B1
(45) Date of Patent: Dec. 21, 2004

(54) INTERNET TELEPHONE APPARATUS AND METHOD FOR AN INTERNET TELEPHONE SET

(75) Inventor: Mikio Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 947 days.

(21) Appl. No.: 09/717,316

(22) Filed: Nov. 22, 2000

(30) Foreign Application Priority Data

Nov. 25, 1999 (JP) ............................................ 11-334288

(51) Int. Cl.⁷ ........................ H04L 12/16; H04L 12/66; H04M 11/00
(52) U.S. Cl. .................... 370/259; 370/352; 379/88.17; 379/210.01; 379/229
(58) Field of Search ............................... 370/259, 260, 370/271, 352, 356, 389, 395.1, 395.2, 395.21, 401, 522; 709/68, 69, 88.17, 88.19, 88.22, 88.23, 88.25, 93.01, 93.05, 93.07, 201.01, 202.01, 210.01, 211.01, 211.02, 212.01, 229, 265.02, 265.09

(56) References Cited

U.S. PATENT DOCUMENTS

| 5,740,231 | A | * | 4/1998 | Cohn et al. ............... 379/88.22 |
| 5,991,291 | A | * | 11/1999 | Asai et al. .................. 370/352 |
| 6,021,126 | A | * | 2/2000 | White et al. ................ 370/352 |
| 6,125,113 | A | * | 9/2000 | Farris et al. ................ 370/352 |
| 6,324,279 | B1 | * | 11/2001 | Kalmanek et al. ........... 379/229 |
| 6,324,280 | B2 | * | 11/2001 | Dunn et al. ................. 379/230 |
| 6,363,065 | B1 | * | 3/2002 | Thornton et al. ........... 370/352 |
| 6,546,003 | B1 | * | 4/2003 | Farris ......................... 370/352 |

FOREIGN PATENT DOCUMENTS

| JP | 184862 | 10/1983 |
| JP | 984140 | 3/1997 |
| JP | 9-168051 | 6/1997 |
| JP | 9-168065 | 6/1997 |
| JP | 9-172462 | 6/1997 |
| JP | 9-261335 | 10/1997 |
| JP | 9-321914 | 12/1997 |
| JP | 10-271162 | 10/1998 |
| JP | 11-69003 | 3/1999 |

OTHER PUBLICATIONS

Japanese Office Action dated Mar. 25, 2003 with English translation of pertinent portions.

* cited by examiner

Primary Examiner—Alpus H. Hsu
(74) Attorney, Agent, or Firm—Whitham, Curtis & Christofferson, PC (57) ABSTRACT

In case that a call connection request message is transmitted from an originating call side and in case that a user on a termination call side cannot make a response over the telephone due to his or her absence, the call connection request message is stored on the termination call side, and in case that the user on the termination call side returns to his or her seat and selects folded communication processing of the received call connection request message, the call connection request message is transmitted by return by means of an address on the companion originating call side, which is included in the received call connection request message, and on the originating call side, in case that call connection cannot be established due to absence of the user on the termination call side, an address of the originating call side is stored, and in case that a folded call connection request message is received from the originating call side, a previously selected response processing is conducted.

18 Claims, 4 Drawing Sheets

INTERNET TELEPHONE APPARATUS AND METHOD FOR AN INTERNET TELEPHONE SET

BACKGROUND OF THE INVENTION

The present invention relates to an internet telephone apparatus, and more particularly to an internet telephone apparatus connected to a network, in which a call connection request message is transmitted to a terminal on a termination call side from a terminal on an originating call side, and a voice call is conducted after call connection is established by means of a response from the terminal on the termination call side.

Conventionally, an internet telephone apparatus for conducting a voice call utilizing an internet has been proposed.

For example, in JP-A-168065/1997 and so forth, a method is disclosed, in which a terminal on a termination call side is called by means of an internet, and in case that connection is unsuccessful, a call is conducted by using a public telephone line.

Also, for example, in JP-A-172462/1997 and so forth, it is disclosed that, when a user is absent, a response message is sent back from a termination call side.

Furthermore, various kinds of methods have been proposed, in which, as a conventional absent call, a matter of an originating call side is accumulated as a voice message (Refer to JP-A-271162/1998 and JP-A-321914/1997, for example.).

However, in the above-mentioned various kinds of internet telephone apparatuses, since it is constructed that, even when a companion to talk with is absent, a voice message is unilaterally sent and accumulated, in case that absence condition of the companion continues for a long time, a situation in which a number of voice messages from an originating call side are repeatedly accumulated is caused.

This extremely troubles a termination call side., since the termination call side needs to repeatedly listen to the accumulated voice messages, and duplicate voice messages and a voice message unnecessary for the termination call side are included therein.

Also, the originating call side needs to put a great deal of work, since a situation in which a number of voice messages are sent is consequently caused with the lapse of time although the originating call side desires to deliver a finally necessary message.

SUMMARY OF THE INVENTION

Accordingly, the objective of the present invention is to solve the above-mentioned tasks.

Moreover, the objective of the present invention is to provide an internet telephone apparatus in which, in case that a voice call is conducted by means of an internet, a bidirectional characteristic between an originating call side and a termination call side can be obtained for absence condition of a user on the termination call side, and it is possible to avoid transmission and accumulation of a useless voice message for the termination call side to conduct an efficient exchange of a voice message.

The objective of the present invention is achieved by an internet telephone apparatus connected to a network, wherein a call connection request message including an address on an originating call side and an address on a termination call side is transmitted to a terminal on the termination call side from a terminal on the originating call side, and a voice call is conducted after call connection is established by means of a response from the terminal on the termination call side, as a function of the termination call side, comprising: a user determination section for determining absence of a user; a storage section on the termination call side, for storing the call connection request message therein in case that it is determined by the user determination section that a user is absent when the call connection request message is received; a designation section for designating an output of contents by a user, which are stored in the storage section on the termination call side; an output section for outputting contents of the call connection request message stored in the storage section on the termination call side in response to designation by means of the designation section; a call connection request section for requesting call connection by a user to the call connection request message output by means of the output section; and a call connection section for conducting call connection based on the address on the originating call side of the call connection request message stored in the storage section in case that the call connection is requested by the call connection request section, and as a function of the originating call side, comprising: a storage section on the originating call side for storing the address on the termination call side therein in case that there is no response from the terminal on the termination call side when the call connection request message is transmitted; an address determination section for determining whether or not the address on the originating call side is included in the address on the termination call side, which is stored in the storage section on the originating call side when the call connection request message is received; and a response section for selecting a predetermined response method which is previously set, and making a response in case that it is determined by the address determination section that a corresponding address is included.

In the internet address apparatus of the present invention, on the termination call side, absence of a user is monitored by the user determination section, and in case that it is determined that a user is absent when the call connection request message is received, the call connection request message is stored in the storage section on the termination call side.

Thereafter, when the user goes back to a telephone device and designates an output of the contents through the designation section, which are stored in the storage section on the termination call side, the output section outputs the contents of the call connection request message stored in the storage section on the termination call side in accordance with this designation.

In case that, in accordance with this output, the user requests call connection by means of the call connection request section, an address on the originating call side of a requested companion is retrieved based on the call connection request message stored in the storage section, and the call connection is conducted by using this address on the originating call side.

At this time, the address on the originating call side of the call connection request message stored in the storage section is made to be an address on the termination call side, and its own address is made to be an address on the originating call side, and the call connection request message is transmitted.

On the other hand, on the originating call side, in case that there is no response from the terminal on the termination call side when the call connection request message is transmitted, an address on the termination call side is stored in the storage section on the originating call side.

Thereafter, in case of receiving the call connection request message, the address determination section determines whether or not the address on the originating call side is included in the address on the termination call side stored in the storage section on the originating call side, and if it is determined that a corresponding address is included, a predetermined response method which is preset is selected and a response is made by means of the response section.

In this manner, in case that the user on the termination call side is absent, without conducting a process in which a voice message is sent and recorded as it is on the termination call side, the call connection request message remains on the termination call side, and when the user on the termination call side goes back, a folded call connection request message is sent to the originating call side, and a response is obtained by means of a response method selected on the originating call side by the call connection.

For example, a matter is recorded as a voice message, and it is possible to make a response using this recorded voice message or to conduct a direct call with a user on the originating call side.

Also, the objective of the present invention is achieved by a method for an internet telephone set connected to a network, wherein a call connection request message including an address on an originating call side and an address on a termination call side is transmitted to a terminal on the termination call side from a terminal on the originating call side, and a voice call is conducted after call connection is established by means of a response from the terminal on the termination call side, as a function of the termination call side, comprising steps of: determining absence of a user; storing the call connection request message in the termination call side in case that it is determined that a user is absent when the call connection request message is received; designating an output of contents by a user, which are stored in the termination call side; outputting contents of the call connection request message stored in the termination call side in response to designation by means of the designating step; requesting call connection by a user to the call connection request message output by means of the outputting step; and conducting call connection based on the address on the originating call side of the call connection request message stored in the termination call side in case that the call connection is requested by the requesting step, and as a function of the originating call side, comprising steps of: storing the address on the termination call side in the originating call side in case that there is no response from the terminal on the termination call side when the call connection request message is transmitted; determining whether or not the address on the originating call side is included in the address on the termination call side, which is stored in the originating call side when the call connection request message is received; and selecting a predetermined response method which is previously set, and making a response in case that it is determined that a corresponding address is included.

Accordingly, in case that a voice call is conducted by means of an internet, a bidirectional characteristic between the originating call side and the termination call side can be obtained for absence condition of a user on the termination call side, and it is possible to avoid transmission and accumulation of a useless voice message for the termination call side to conduct an efficient exchange of a voice message.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Below, embodiments of an internet telephone apparatus in accordance with the present invention will be explained in detail.

The internet telephone apparatus in accordance with an embodiment of the present invention is connected to a network (internet/LAN) in which a band is not ensured, and =in the apparatus, a voice call is conducted once call connection is conducted, and in case that there is no response from a termination call side for a call connection request from an originating call side, efficient correspondence can be conducted.

In addition, in the explanation below, first, a basic arrangement of an internet telephone apparatus to which the present invention is applied, and then, folded communication processing during absence of a user on a termination call side, which is a feature of the present invention, will be explained.

Figure 1:
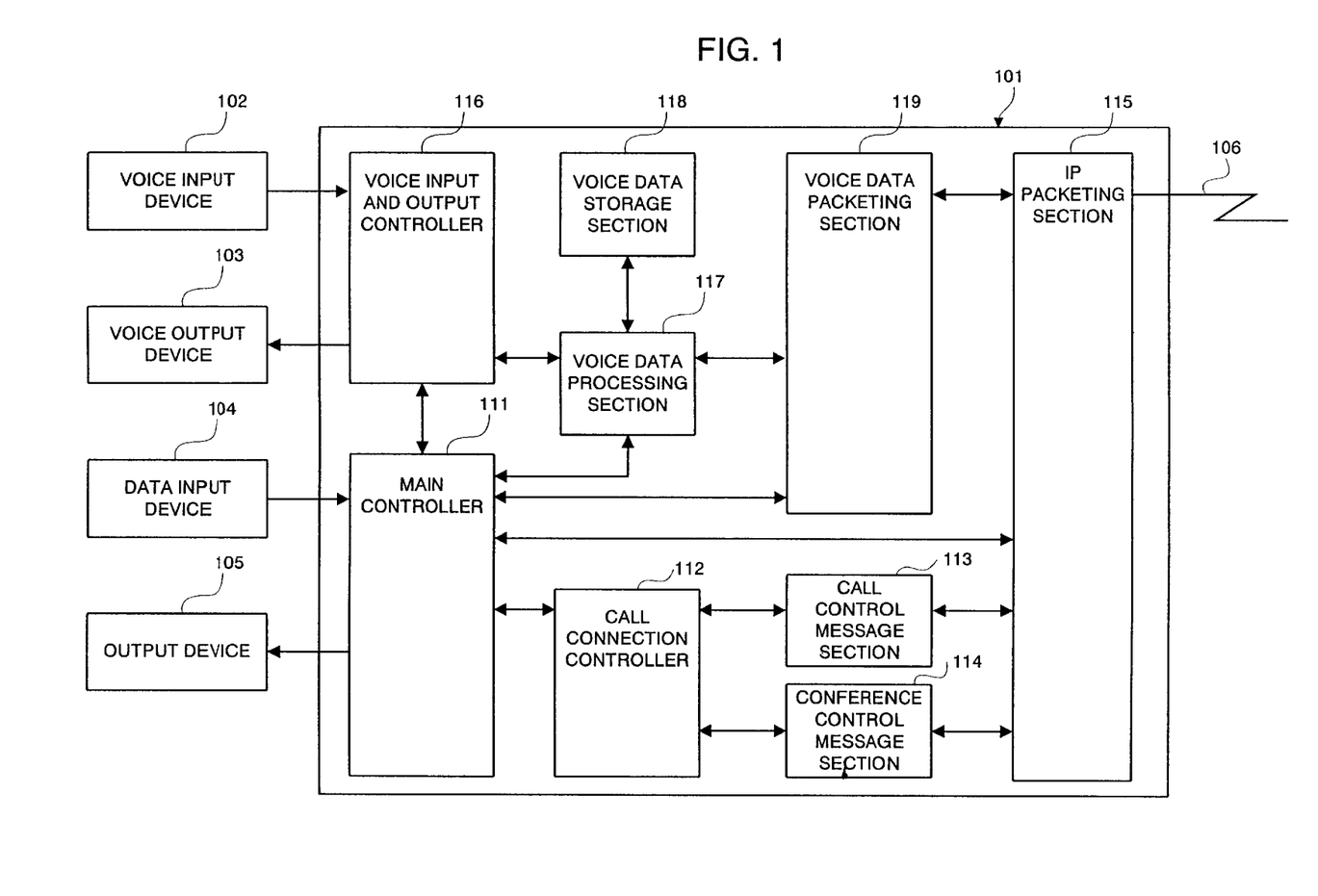
FIG. 1 is a block diagram showing an arrangement of an internet telephone apparatus in an embodiment of the present invention.

FIG. 1 is a block diagram showing an arrangement of an internet telephone apparatus in this embodiment.

This internet telephone apparatus is constructed of a telephone device body 101, and a voice input device 102, a voice output device 103, a data input device 104 and an output device 105 which are connected to the telephone device body 101, and through a communication line 106, the internet telephone apparatus is adapted to be connected to an internet telephone apparatus or a video conference device that are a companion to talk with and connected to a network.

Here, the telephone device body 101 is a circuit device for mutually inputting and outputting a voice data to conduct a call with the internet telephone apparatus or the video conference device using the video data, which are a companion to talk with.

Also, the voice input device 102 is typically a microphone, and is for inputting voice. And, the voice output device 103 is typically a speaker and a headphone, and is for outputting voice.

Also, the data input device 104 is for inputting the number of a companion to talk with and various kinds of data for other operations, such as a ten key and a key button.

Also, the output device 105 is an LED lamp for showing termination from a companion terminal and for showing condition of its own terminal, an LCD for showing information input from the data input device 104, and so forth.

Next, an arrangement of the telephone device body 101 will be explained.

The telephone device body 101 includes a main controller 111, a call connection controller 112, a call control message section 113, a conference control message section 114, an IP packeting section 115, a voice input and output controller 116, a voice data processing section 117, a voice data storage section 118, a voice data packeting section 119.

The voice input and output controller 116 is connected to the voice input device 102 and the voice output device 103, and for conducting input and output control of a voice data, and also, is connected to the voice data processing section 117 in the telephone device body 101.

The voice data processing section 117 is connected to the voice data storage section 118, the voice data packeting section 119 and the main controller 111, and compresses a voice data input through the voice input and output controller 116, and outputs it to the voice data packeting section 119, and also, decodes the compressed voice data received from the voice data packeting section 119, and outputs it to the voice input and output controller 116.

Also, the voice data processing section 117 compresses a voice message stored in the voice data storage section 118, and expands and stores a voice data input from the voice data packeting section 119.

The voice data packeting section 119 is connected to the communication line 106 via the IP packeting section 115, and conducts processing for pocketing the compressed voice data into a predetermined data form in sending it to the communication line 106, and processing for isolating a voice data packet from a data sent from the IP packeting section 115, to which IP packeting is applied, and for outputting it to the voice data processing section 117.

Also, the IP packeting section 115 is for conducting transmission and reception control of a data via the communication line 106.

Also, the main controller 111 is for wholly controlling several kinds of processing in the telephone device body 101.

Also, the call connection controller 112 provides instruction of encoding and decoding of a message with respect to call connection of a call connection request, a call connection response and a call disconnection response in relation to call control with a communication terminal, and a conference attendance request and a conference attendance response and so forth in relation to conference opening control to the call control message section 113 and the conference control message section 114.

Also, the call control message section 113 encodes a message for a call connection request, a call connection response and a call disconnection request, which is input from the call connection controller 112, and outputs the encoded message to the IP packeting section 115. Also, the call control message section 113 decodes a message for a call connection request, a call connection response and a call disconnection request from a companion terminal, which is input from the IP packeting section 115, and outputs the decoded message to the call connection controller 112.

The conference control message section 114 encodes a message for a conference attendance request and a conference attendance response, which is input from the call connection controller 112, and outputs the encoded message to the IP packeting section 115. Also, the conference control message section 114 decodes a message for a conference attendance request and a conference attendance response from a companion terminal, which is input from the IP packeting section 115, and outputs the decoded message to the call connection controller 112.

The IP packeting section 115 conducts processing for packeting a voice data input from the voice data packeting section 119, and a message input from the call control message section 113 and the conference control message section 114 into a predetermined data form which can be sent to a network, and converts the packeted data input from the communication line 106 to a voice data to be outputted to the voice data packeting section 119 or a message to be outputted to the call control message section 113 and the conference control message section 114.

Next, the operation of the above internet telephone apparatus will be explained.

First, the operation until call connection between the internet telephone apparatuses is normally conducted, and an exchange of a voice data is conducted will be explained using FIG. 1, FIG. 2 and FIG. 3.

Figure 2:
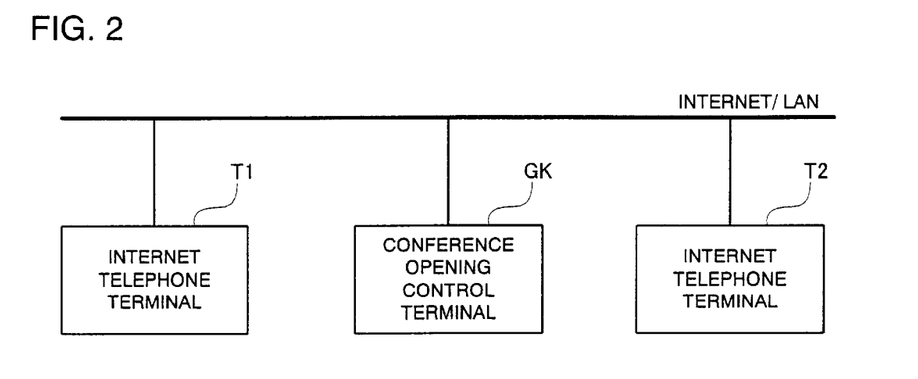
FIG. 2 is a block diagram showing a connection arrangement of a network system to which the internet telephone apparatus shown in FIG. 1 is connected.
Figure 3:
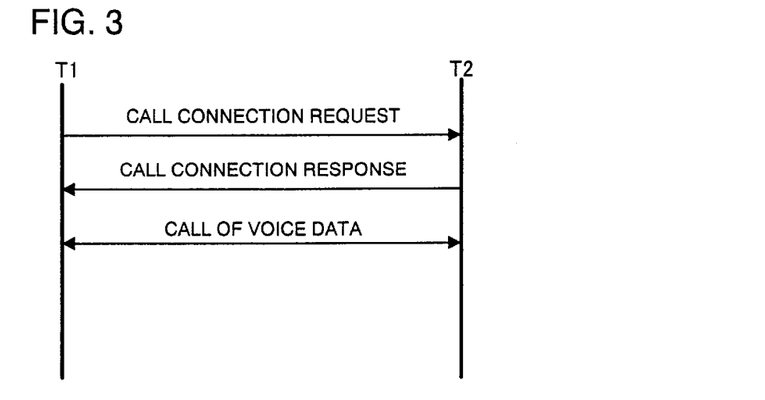
FIG. 3 is an explanation view showing an exchange of signals during call connection of the internet telephone apparatuses shown in FIG. 1.

FIG. 2 is a block diagram showing a connection arrangement of a network system in this embodiment, and FIG. 3 is an explanation view showing an exchange of signals during call connection of the respective internet telephone apparatuses.

Here, internet telephone apparatuses (T1, T2) connected to a network will be explained by assuming that a terminal on an originating call side is an internet telephone device $T_1$, and a terminal on a termination call side is an internet telephone device T2.

(1) Issue of a call connection request message

When a user sends a connection request to the internet telephone device T2 on a termination call side from the internet telephone device T1 on an originating call side via the data input device 104, a connection request command from the user is input to the main controller 111.

The main controller 111 provides the call connection controller 112 with instruction such that processing to the call connection request should be conducted, and the call connection controller 112 encodes a message to the call connection request, and sends the call control message section 113 instruction such that a message should be outputted to the IP packeting section 115.

The call control message section 113 encodes a message to the instruction from the call connection controller 112, and outputs it to the IP packeting section 115, and the call connection request message is sent to the communication line 106.

(2) Reception of a call connection request message

In the internet telephone device T2 which received the call connection request message from a companion terminal, the message is delivered to the call control message section 113 via the IP packeting section 115, and it is decoded in the call control message section 113.

The call connection controller 112 to which the decoded message is input from the call control message section 113 determines whether or not the received message is included in a correct sequence, and if correct, the call connection controller 112 notifies the main controller 111 of the reception of the call connection request message from the internet telephone device T1. The main controller 111 outputs the message to the output device 105, which was input from the call connection controller 112, and notifies a user of the reception of the call connection request.

(3) Issue of a call connection response message

A user who recognized the reception of the call connection request message conducts response processing (in which, for example, in case of a telephone set, a receiver is picked up, and in case of application software of a personal computer and so forth, a response button on a screen is pushed.) to the connection request of the internet telephone device T1 through the data input device 104.

To a connection response command from the data input device 104, the main controller 111 provides the call connection controller 112 with instruction such that a response message should be sent, and the call connection controller 112 which received this instruction provides the call control message section 113 with instruction such that a call connection response message should be encoded.

The call control message section 113 encodes the message to the instruction from the call connection controller 112, and outputs it to the IP packeting section 115, and it is sent to the communication line 106 through the connection response message.

(4) Reception of a call connection response message

The internet telephone device T1 correctly processes the call connection response message sent from the internet telephone device T2, and thereby, the internet telephone devices T1 and T2 become to be condition in which a call of a voice data is available.

(5) Voice call

With regard to the transmission of a voice data, a user inputs voice to the voice input device 102, and in the voice input and output controller 116, A/D conversion is applied to this input voice data and the input voice data is converted to a data form which can be processed in the voice data processing section 117, and the converted data is output to the voice data processing section 117.

In the voice data processing section 117, the input voice data is compressed, and packeting is applied thereto by means of the voice data packeting section 119 so that the data can be sent to a network. A header for discriminating the packeted data from a control data is added to the packeted voice data through the IP packeting section 115, and IP packeting is applied to the packeted voice data so that the data is actually sent to a network, and the packeted voice data is sent through the communication line 106.

With regard to the reception of a voice data, out of the IP packeted voice data which was input through the communication line 106, only voice data packet are selected in the IP packeting section 115, and are rearranged in correct order according to the transmission from the voice data packeting section 119.

The voice data which was rearranged in correct order according to the transmission is expanded in the voice data processing section 117, and D/A conversion is applied thereto in the voice input and output controller 116, and the converted data is sent to the voice output device 103, and a user can recognize the received voice data.

Figure 4:
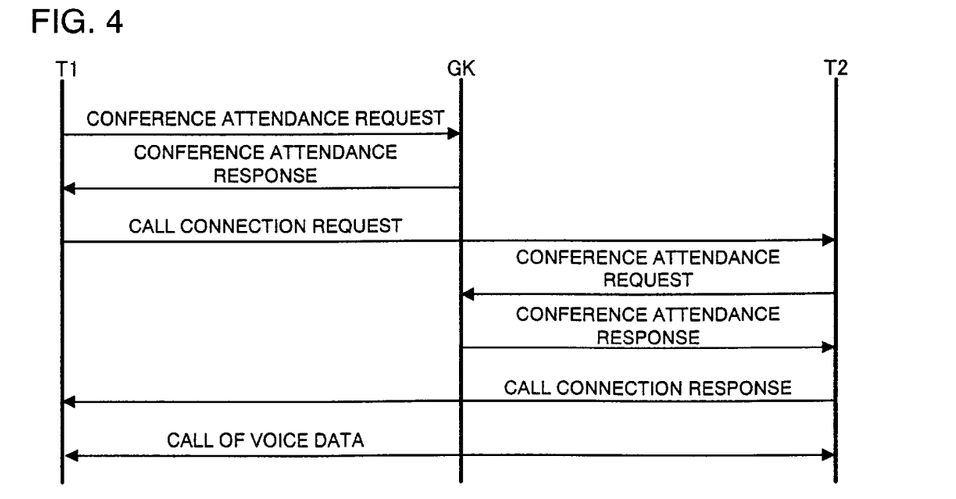
FIG. 4 is an explanation view showing an exchange of signals during holding a conference of the internet telephone apparatus shown in FIG. 1.

Next, a case in which the internet telephone terminals (T1, T2) and a conference opening control terminal (GK) are connected to a network will be explained.

FIG. 4 is an explanation view showing an exchange of signals during holding a conference.

In case that the conference opening control terminal (GK) is connected to a network, before conducting communication with a companion terminal, the internet telephone apparatus transmits a conference attendance request message to the conference opening control terminal GK, and the conference opening control terminal GK determines whether or not connection can be established based on a confusion situation of the network, and if the connection can be established, the conference opening control terminal GK transmits a conference attendance response that is conference attendance permission. By receiving this conference attendance response, the internet telephone apparatus conducts a successive call connection operation (a call connection request, a call connection response and call disconnection).

(1) Issue of a conference attendance request message

When a user of the internet telephone apparatus T1 sends a call connection request to the internet telephone apparatus T2 through the data input device 104, first the main controller 111 instructs the call connection controller 112 to issue a conference attendance request message to the conference opening control terminal GK.

The call connection controller 112 instructs the conference control message section 114 to encode the conference attendance request message, and in response to the instruction, the message is encoded in the conference control message section 114, and the encoded conference attendance control message is sent to the communication line 106 via the IP packeting section 115.

(2) Issue of a conference attendance message (GK)

The conference opening control terminal GK which received the conference attendance request message transmits a conference attendance response message to the internet telephone apparatus T1 in case that communication between the internet telephone apparatus T1 and the internet telephone apparatus T2 can be conducted in accordance with a confusion situation of the network.

(3) Reception of a conference attendance response message —Issue of a call connection request message In the internet telephone apparatus $T_1$ which received the conference attendance response message from the conference opening control terminal GK, the message is delivered to the conference control message section 114 via the IP packeting section 115, and in the conference control message section 114, the message is decoded, and the decoded message is sent to the call connection controller 112.

The call connection controller 112 determines the contents of the received message and whether or not the decoded message is included in a correct sequence, and if correct, the call connection controller 112 subsequently instructs the call control message section 113 to encode the call connection request message and output the encoded message to the IP packeting section 115. The call connection request message encoded in the call control message section 113 is sent to the communication line 106 through IP packeting section 115.

(4) Reception of a call connection request message— Issue of a conference attendance request message In the internet telephone apparatus T2 which received the call connection request message from a companion terminal, the message is decoded, and the above-mentioned processing is conducted, and a user recognizes the reception of the call connection request message from the internet telephone apparatus T1. The user who recognized the reception of the call connection request message conducts response instruction processing to the data input device 104 if the user desires the connection.

In response to the connection response instruction from the data input device 104, the main controller 111 instructs the call connection controller 112 to send a response message. The call connection controller. 112 which received this instruction, first, determines whether or not the conference opening control terminal GK is connected, and if the conference opening control terminal GK is connected, the call connection controller 112 instructs the conference opening control terminal GK to issue a conference attendance request message, and instructs the conference control message section 114 to issue a conference attendance request message when the call connection controller 112 receives the conference attendance response message from the conference opening control terminal GK.

When a user of the internet telephone apparatus $T_1$ requests call connection to the internet telephone apparatus T2 via the data input device 104, the main controller 111 first provides instruction to the conference control message section 114 so that the call connection controller 112 issues a conference attendance request message.

The conference control message section 114 encodes the message in relation to the instruction, and sends it to the communication line 106 via the IP packeting section 115. The conference opening control terminal GK which received the conference attendance request message determines whether or not the internet telephone apparatus T2 can hold a conference based on a confusion situation and so forth of a network, namely, whether or not the internet telephone apparatus T2 can call to the internet telephone apparatus T2, and if the conference can be held, the conference opening control terminal GK transmits a conference attendance response message to the internet telephone apparatus T2.

In the internet telephone apparatus T2 which received the conference attendance response message from the conference opening control terminal GK, the message is delivered to the conference control message section 114 via the IP packeting section 115, and is decoded in the conference control message section 114.

The call connection controller 112 determines whether or not the decoded message is included in a correct sequence, and if correct, the call connection controller 112 subsequently issues a call connection response message to the call control message section 113.

(5) Transmission and reception of a voice data

The internet telephone apparatus T1 correctly completes the processing of the call connection response message which was sent from the internet telephone apparatus T2, and thereafter, the internet telephone apparatuses T1 and T2 become to be condition in which a call of a voice data can be conducted.

In addition, the conference opening control terminal GK is not involved in a call of voice. Also, since processing with respect to a call of voice in the internet telephone apparatuses T1 and T2 is the same as mentioned above, the explanation thereof is omitted.

Next, folded communication processing when a user on a termination call side is not absent will be explained, which is a feature of the present invention.

In this processing, in case that a call connection request message is transmitted from an originating call side, when a user on a termination call side cannot make a response over the telephone due to his or her absence, the call connection request message is stored in the termination side, and in case that the user on the termination call side returns to his or her seat and selects folded communication processing of the received call connection request message, the call connection request message is transmitted by return based on an address (an IP address in this embodiment) of a companion originating call side, which is included in the call connection request message, and a recorded message from a companion side or a message by means of a direct call can be heard by means of the call connection.

In addition, this function can be suitably selected by means of mode selection through each internet telephone apparatus.

Figure 5:
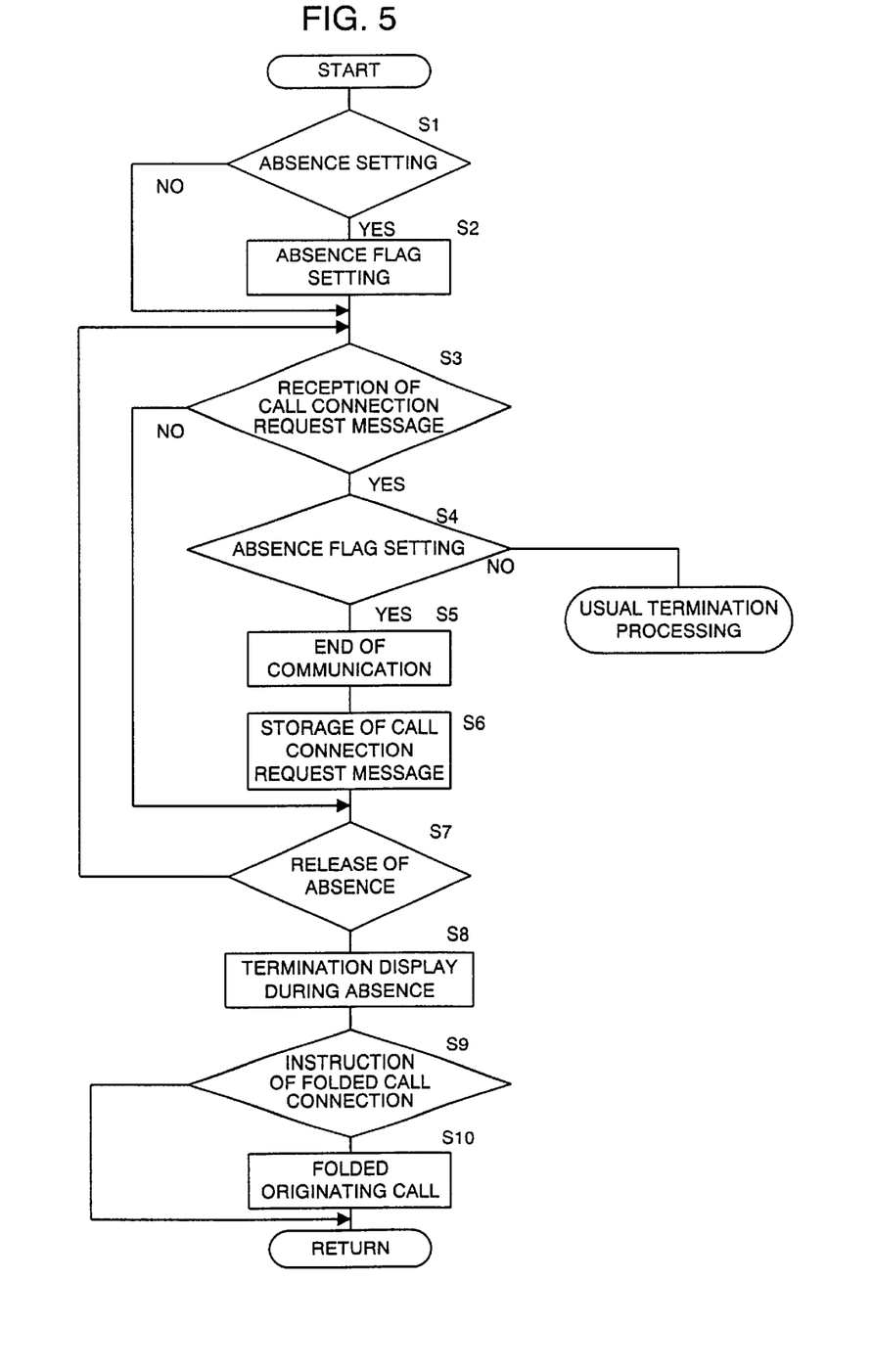
FIG. 5 is a flowchart showing an operation of a termination call side during folded communication processing between the internet telephone apparatuses shown in FIG. 1.
Figure 6:
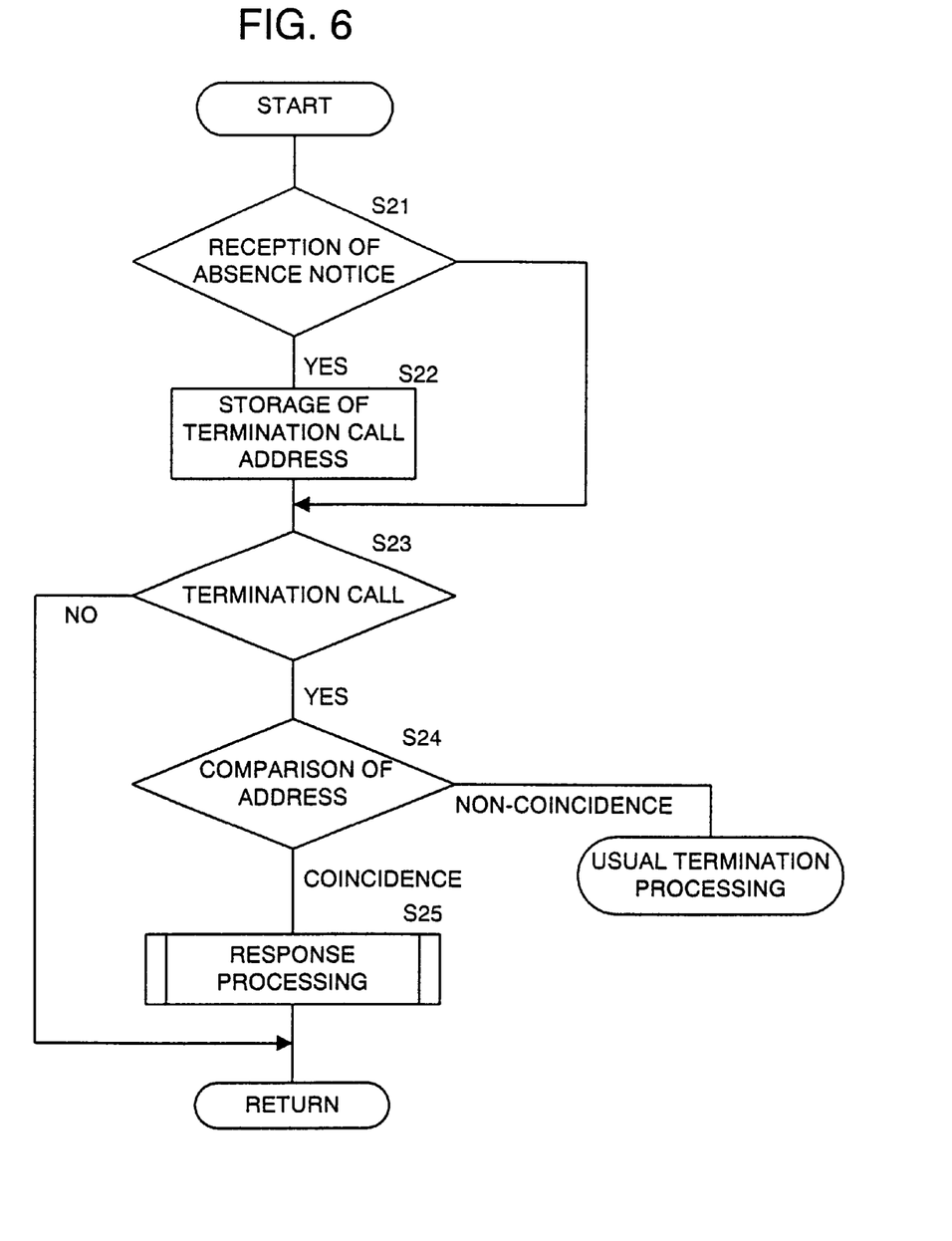
FIG. 6 is a flowchart showing an operation of an originating call side during folded communication processing between the internet telephone apparatuses shown in FIG. 1.

FIG. 5 and FIG. 6 are flowcharts folded communication processing between the respective internet telephone apparatuses, and FIG. 5 shows an operation of the internet telephone apparatus T2 on a termination call side, and FIG. 6 shows an operation of the internet telephone apparatus T1 on an originating call side.

First, an IP address on an originating call side and an IP address on a termination call side are stored in a call connection request message that is transmitted between the internet telephone apparatuses T1 and T2.

And, in case that a user leaves his or her seat in the internet telephone apparatus T2 on a termination call side, absence setting as below is conducted.

With regard to this absence setting, a user previously conducts setting of the absence in the main controller 111 via the data input device 104 (S1), and to this absence setting, the main controller 111 provides an absence flag and so forth, and holds condition which was set (S2).

And, when receiving a call connection request message from the internet telephone apparatus T1 on an originating call side (S3), the call control message section 113 decodes this message, and if it is determined by the call connection controller 112 that the decoded message is a correct sequence, the call control message section 113 determines whether or not the absence flag is set in the main controller 111 (S4).

Here, in case that the absence flag is set, the main controller 111 notifies the internet telephone apparatus T1 on the originating call side that the user is' absent, and ends the communication (S5) and stores the call connection request message (s6).

Thereafter, when the user of the internet telephone apparatus T2 on the termination call side returns to his or her seat, and releases the absence setting (S7), the main controller 111 displays the reception on an LCD of the output device 105 (S8).

The user of the internet telephone apparatus T2 on the termination call side recognizes the reception of the call connection request message from the internet telephone apparatus T1, and instructs the main controller 111 to conduct folded call connection to the originating call side of this stored call connection request message (S9).

The main controller 111 which received this instruction sets an IP address on the termination call side, which is included in the call connection request message, as an IP address on the originating call side, and transmits the call connection request message by return to the internet telephone apparatus T1 (S10).

On the other hand, in the internet telephone apparatus T1, in case that notification of the user on the termination side is received during the originating call (S21), the IP address on the termination side of the call connection request message is stored in the main controller 111 (S22).

Thereafter, in case that there is a termination call (S23), the IP address on the originating call side, which is included in the call connection request message, is read, and is compared with the IP address on the termination call side, which was stored at the step S22 (S24).

And, if they coincide with each other, based on response processing which was previously selected, response processing is conducted (S25). In addition, if the IP address on the originating call side does not coincide with the IP address on the termination call side, the usual termination call processing is conducted.

With regard to the response processing at the step S25, for example, in case that the absence notification is received at the step S21, a message by which a matter is conveyed is input from the voice input device 102, and is recorded in the internet telephone apparatus T1, and this recorded message can be sent to the internet telephone apparatus T2 as a response message.

Also, in case that the absence notification is received as mentioned above, the message is not recorded and a message which was previously recorded can be delivered.

Moreover, it can be selected that the user directly conducts a call over the telephone. In this case, in the internet telephone apparatus T1, a reception notification operation for notifying the user of the reception is conducted, and a response from the user is demanded.

In addition, since, in the above folded communication processing, the detail of the call connection operation and the voice call operation between the internet telephone apparatuses T1 and T2 is common to the case in which the above-mentioned usual communication operation is conducted, individual explanation thereof will be omitted.

As explained above, in the internet telephone apparatus of the present invention, in case that a call connection request message is transmitted from an originating call side and in case that a user on a termination call side cannot make a response over the telephone due to his or her absence, the call connection request message is stored on the termination call side, and in case that the user on the termination call side returns to his or her seat and selects folded communication processing of the received call connection request message, the call connection request message is transmitted by return by means of an address on the companion originating call side, which is included in the received call connection request message, and by means of call connection, response processing by means of a recorded message from a companion or a direct call is conducted.

Accordingly, an advantage can be effected: In case that a voice call is conducted by means of an internet, a bidirectional characteristic between an originating call side and a termination call side can be obtained for absence condition of a user on the termination call side, and it is possible to avoid transmission and accumulation of a useless voice message to conduct an efficient exchange of a voice message.

The entire disclosure of Japanese Patent Application No. 11-334288 filed on Nov. 25, 1999 including specification, claims, drawing and summary are incorporated herein by reference in its entirety.

What is claimed is:

1. An internet telephone apparatus connected to a network, wherein a call connection request message including an address on an originating call side and an address on a termination call side is transmitted to a terminal on said termination call side from a terminal on said originating call side, and a voice call is conducted after call connection is established by means of a response from said terminal on said termination call side, as a function of said termination call side, comprising:
a user determination section for determining absence of a user;
a storage section on said termination call side, for storing said call connection request message therein in case that it is determined by said user determination section that a user is absent when said call connection request message is received;
a designation section for designating an output of contents by a user, which are stored in said storage section on said termination call side;
an output section for outputting contents of said call connection request message stored in said storage section on said termination call side in response to designation by means of said designation section;
a call connection request section for requesting call connection by a user to said call connection request message output by means of said output section: and
a call connection section for conducting call connection based on said address on said originating call side of said call connection request message stored in said storage section in case that said call connection is requested by said call connection request section, and as a function of said originating call side, comprising:
a storage section on said originating call side for storing said address on said termination call side therein in case that there is no response from said terminal on said termination call side when said call connection request message is transmitted;
an address determination section for determining whether or not said address on said originating call side is included in said address on said termination call side, which is stored in said storage section on said originating call side when said call connection request message is received; and
a response section for selecting a predetermined response method which is previously set, and making a response in case that it is determined by said address determination section that a corresponding address is included.

2. An internet telephone apparatus according to claim 1, wherein said response section includes a section for transmitting a voice message for delivering a preset message to a companion terminal.

3. An internet telephone apparatus according to claim 2, wherein said response section includes a section for selecting whether a voice message for delivering a preset message is transmitted to a companion terminal or a user directly make a response.

4. An internet telephone apparatus according to claim 2, wherein said voice message for delivering said preset message is recorded in a recording section in case that there is no response from said terminal on said termination call side when said call connection request message is transmitted.

5. An internet telephone apparatus according to claim 2, wherein plural kinds of said voice message for delivering said preset message are previously recorded in a recording section, and said plural kinds of said voice message are selected in accordance with said address on said termination call side, which is stored in said storage section on said originating call side, and are transmitted to a companion terminal device.

6. An internet telephone apparatus according to claim 3, wherein plural kinds of said voice message for delivering said preset message are previously recorded in a recording section, and said plural kinds of said voice message are selected in accordance with said address on said termination call side, which is stored in said storage section on said originating call side, and are transmitted to a companion terminal device.

7. An internet telephone apparatus according to claim 1, wherein said user determination section includes a section for determining absence of a user by means of a user absence setting operation.

8. An internet telephone apparatus according to claim 1, wherein said designation section includes a section for releasing absence of a user by means of a user absence setting release operation.

9. An internet telephone apparatus according to claim 1, wherein an IP address is used for said address on said originating call side and said address on said termination call side.

10. A method for an internet telephone set connected to a network, wherein a call connection request message including an address on an originating call side and an address on a termination call side is transmitted to a terminal on said termination call side from a terminal on said originating call side, and a voice call is conducted after call connection is established by means of a response from said terminal on said termination call side, as a function of said termination call side, comprising steps of:

determining absence of a user;

storing said call connection request message in said termination call side in case that it is determined that a user is absent when said call connection request message is received;

designating an output of contents by a user, which are stored in said termination call side;

outputting contents of said call connection request message stored in said termination call side in response to designation by means of said designating step;

requesting call connection by a user to said call connection request message output by means of said outputting step; and conducting call connection based on said address on said originating call side of said call connection request message stored in said termination call side in case that said call connection is requested by said requesting step, and as a function of said originating call side, comprising steps of:

storing said address on said termination call side in said originating call side in case that there is no response from said terminal on said termination call side when said call connection request message is transmitted;

determining whether or not said address on said originating call side is included in said address on said termination call side, which is stored in said originating call side when said call connection request message is received; and selecting a predetermined response method which is previously set, and making a response in case that it is determined that a corresponding address is included.

11. A method for an internet telephone set according to claim 10, wherein said selecting step includes a step of transmitting a voice message for delivering a preset message to a companion terminal.

12. A method for an internet telephone set according to claim 11, wherein said selecting step includes a step of selecting whether a voice message for delivering a preset message is transmitted to a companion terminal or a user directly make a response.

13. A method for an internet telephone set according to claim 11, wherein said voice message for delivering said preset message is recorded in a recording section in case that there is no response from said terminal on said termination call side when said call connection request message is transmitted.

14. A method for an internet telephone set according to claim 11, wherein plural kinds of said voice message for delivering said preset message are previously recorded in a recording section, and said plural kinds of said voice message are selected in accordance with said address on said termination call side, which is stored in said originating call side, and are transmitted to a companion terminal device.

15. A method for an internet telephone set according to claim 12, wherein plural kinds of said voice message for delivering said preset message are previously recorded in a recording section, and said plural kinds of said voice message are selected in accordance with said address on said termination call side, which is stored in said originating call side, and are transmitted to a companion terminal device.

16. A method for an internet telephone set according to claim 10, wherein said determining step on said termination call side includes a step of determining absence of a user by means of a user absence setting operation.

17. A method for an internet telephone set according to claim 10, wherein said designating step includes a step of releasing absence of a user by means of a user absence setting release operation.

18. A method for an internet telephone set according to claim 10, wherein an IP address is used for said address on said originating call side and said address on said termination call side.

* * * * *